es Patent Office 3,453,125
Patented July 1, 1969

3,453,125
PLASTICIZED SULFUR COMPOSITIONS
Ralph P. Williams, Bartlesville, Okla., assignor to Phillips Petroleum Company, a corporation of Delaware
No Drawing. Filed Oct. 10, 1966, Ser. No. 585,320
Int. Cl. C09d 1/00
U.S. Cl. 106—19                16 Claims

ABSTRACT OF THE DISCLOSURE

The viscosity of plasticized sulfur compositions comprising elemental sulfur plasticized with an organic sulfur-plasticizing agent is reduced by the addition of a modifying amount of a persulfide of the formula $$A\text{—}R\text{—}S_x\text{—}R\text{—}A$$

wherein each R is a hydrocarbon radical having up to about 10 carbon atoms, at least one A is hydroxyl or carboxyl and x is an integer of from 2 to about 5.

BACKGROUND OF THE INVENTION

This invention relates to a new composition of matter, and a method for preparing said composition.

In another aspect, the invention relates to a new composition of matter comprising a plasticized sulfur composition and a persufide compound containing at least one oxygenated radical.

In another aspect, the invention relates to a new composition of matter comprising a plasticized sulfur composition and a persulfide compound having the general formula A—$R_1$—$S_x$—$R_2$—A (I) wherein A is selected from carboxyl, hydrogen, and hydroxyl groups, at least one A being hydroxyl or carboxyl, and $R_1$ and $R_2$ are selected from saturated aliphatic, saturated cycloaliphatic, and aromatic radicals, and combinations thereof having up to about 10 carbon atoms per radical or more, and x is an integer from 2 to 5.

In another aspect, the invention relates to a method of reducing the viscosity of plasticized sulfur compositions comprising forming a mixture of said plasticized sulfur compositions with a persulfide compound containing at least one oxygenated radical.

In another aspect, the invention relates to combining a plasticized sulfur composition with a compound selected from mercapto acids and mercapto alcohols, or with a mixture of a thiol with a mercapto acid or alcohol, whereby the viscosity of said plasticized sulfur composition is substantially reduced by formation of a persulfide compound containing at least one oxygenated radical in situ.

In still another aspect, the invention relates to a method of reducing the viscosity of a plasticized sulfur composition by combining said plasticized sulfur composition with a persulfide compound formed by contacting sulfur or sulfur yielding compound with a compound selected from mercapto acids and mercapto alcohols, or with a mixture of a thiol and a mercapto acid or alcohol.

Blending elemental sulfur with a suitable plasticizing material, generally an organic material which reacts at least in part with the sulfur, produces a plasticized composition which has a number of uses. The use of such compositions as road-marking material, coatings for buildings, and other similar uses requiring durability is steadily increasing. Such compositions are frequently quite viscous because of the presence of substances such as pigments or fillers. As a result, it is difficult to apply such compositions to surfaces at a rapid rate, as, for example, in a spraying operation.

It is an object of this invention to reduce the viscosity of plasticized sulfur compositions. Another object is to make plasticized sulfur compositions suitable for spraying and other rapid application operations. Another object is to provide a durable plasticized sulfur composition that is easy to apply, dries quickly, and remains durable for long periods of time.

According to the invention, a method is provided for reducing the viscosity of plasticized sulfur compositions comprising forming a mixture of said plasticized sulfur compositions with a persulfide compound containing at least one oxygenated radical. Generally, persulfides having the general formula A—$R_1$—$S_x$—$R_2$—A wherein A is selected from carboxyl, hydrogen, and hydroxyl groups, at least one A being selected from carboxyl and hydroxyl, $R_1$ and $R_2$ are selected from saturated aliphatic, saturated cycloaliphatic, and aromatic radicals, and combinations thereof, and x is an integer from 2 to 5, can be used in the practice of this invention. The effect of adding such persulfides is quite dramatic and depends in part on the presence of an oxygenated functional group as well as a persulfide linkage. It is noteworthy that a sulfide, that is, a —$S_x$— compound wherein x is 1, does not lower the viscosity of the plasticized sulfur composition, nor is a disulfide effective which does not contain an oxygenated radical.

The method of this invention is particularly suitable for forming a new composition of matter comprising a plasticized sulfur composition and a persulfide containing at least one oxygenated functional group. Persulfides having the general Formula I described above are presently preferred, and are presently believed to be most effective.

Several methods can be employed for forming a mixture of plasticized sulfur compositions with the persulfide compounds. In one embodiment, the persulfide additive is prepared by the reaction of elemental sulfur with a mercapto compound selected from mercapto acids and mercapto alcohols, or by reaction with a thiol and a mercapto acid or alcohol, at temperatures of from about 150° to about 200° C. The resulting compound is a persulfide of the formula A—$R_1$—$S_x$—$R_2$—A wherein x is an integer from 2 to 5, $R_1$ and $R_2$ are saturated aliphatic, saturated cycloaliphatic, and aromatic radicals and combinations thereof, and A is selected from carboxyl, hydrogen, and hydroxyl radicals, at least one A being selected from carboxyl and hydroxyl radicals.

Mercapto acids have the general formula

HOOC—R—SH wherein R is a divalent saturated aliphatic or saturated cycloaliphatic, or aromatic radical or a combination thereof, and wherein R preferably contains from 1 to 10 carbon atoms or more. Examples of such acids are:

Mercaptoacetic acid
2-mercaptopropionic acid
3-mercaptopropionic acid
4-mercaptobutyric acid
4-mercaptocyclohexanoic acid
3-mercaptobenzoic acid
4-mercaptobenzoic acid
3-methyl-4-mercaptocyclohexanoic acid
4-mercapto-o-toluic acid
5-mercapto-m-toluic acid
2-mercapto-p-toluic acid
2-ethyl-4-mercaptobutyric acid
3-butyl-5-mercaptocyclohexanoic acid
11-mercaptoundecanoic acid
8-mercapto-4-ethylnonanoic acid.

Though any mercapto acid is suitable, it is presently preferred to use acids in which the thiol group is somewhat removed from the acid group. For example, mercapto acids containing terminal thiol groups are especially effective.

Mercapto alcohols have the generic formula $$HO-R-SH$$

wherein R is a divalent saturated aliphatic, saturated cycloaliphtic or aromatic radical or a combination thereof, preferably containing 1 to 10 carbon atoms. Examples are:

2-mercapto-1-propanol
3-mercapto-1-propanol
4-mercapto-1-butanol
4-mercaptocyclohexanol
4-mercaptophenol
4-mercapto-o-toluol
5-mercapto-m-toluol
2-mercapto-p-toluol
2-mercapto-4-mercaptobutanol
3,3-dimethyl-8-mercaptooctanol
2-ethyl-6-mercaptoheptanol.

As with the mercapto acids, it is presently preferred to use mercapto alcohols in which the mercapto group is somewhat removed from the hydroxyl group. For example, mercapto alcohols containing a terminal thiol group are especially effective in the practice of this invention.

Suitable thiols for the practice of this invention have the general formula H—R—SH, wherein R is defined as above. Examples are: 1-propanethiol, and 1-butanethiol.

In yet another embodiment, a mixture of plasticized sulfur composition and a persulfide compound containing at least one oxygenated radical can be prepared by adding a mercapto compound such as a mercapto acid or a mercapto alcohol, or a mixture of a mercapto acid or alcohol with a thiol, directly to the plasticized sulfur composition. Upon heating the mixture to the reaction temperature, the acid or alcohol reacts with the sulfur or a sulfur yielding compound in the plasticized sulfur composition, and the persulfide compound is formed in situ. Alternatively, the mercapto alcohol or mercapto acid can be added to a mixture of sulfur and plasticizing material so that the viscosity-improved composition is obtainable in a single step. At present, however, it is preferred to make the persulfide compound first, and then to add said persulfide to the plasticized sulfur composition or to the mixture of sulfur and plasticizing material in precisely measured amounts. Ordinarily the mercapto acid and/or alcohol is combined with sulfur in a ratio of from about 2 to about 5 mols of sulfur (sulfur=32.06) per mol of mercapto compound. However, other molar ratios, such as from about 1.5:1 to about 10:1 can be used if desired. Mercapto acids, thiols and mercapto alcohols having the formulas and characteristics described above with reference to the first embodiment are suitable in the practice of the second embodiment.

The plasticized sulfur compositions to which the present invention is applicable are those comprising elemental sulfur which has been treated by a plasticizing material suitable to provide a material with satisfactory adhesion and durability properties. Such plasticizing materials include, for example, aryl polysulfides, alkyl polysulfides, organic polythiols, chlorinated polyphenyls, wood rosin, natural rubber, butyl rubber, olive oil, organic esters, alkyl resins, and the like, and combinations of these.

Particularly applicable are the sulfur compositions plasticized by organic polythiols. Such compositions are produced by the reaction of certain polythiols with elemental sulfur in the presence of a basic catalyst. Applicable polythiols are those having the formula $Y(SH)_n$, where $n$ is an integer selected from the group consisting of 2, 3, and 4, preferably 2 or 3, and Y is a radical having a valence of $n$ and containing 2–30, preferably 2–20, carbon atoms, each of said carbon atoms preferably having attached thereto not more than one SH group, said radical Y being selected from the group consisting of (A) radicals containing carbon and hydrogen only, (B) radicals containing carbon, hydrogen, and oxygen only, and (C) radicals containing carbon, hydrogen, and sulfur only, the sulfur being present as monosulfide linkages. Radicals containing carbon and hydrogen only include saturated aliphatic, unsaturated aliphatic, saturated cycloaliphatic, unsaturated cycloaliphatic, and aromatic radicals, and combinations thereof. Radicals containing carbon hydrogen, and oxygen only include saturated aliphatic, unsaturated aliphatic, saturated cycloaliphatic, and unsaturated cycloaliphatic radicals and aromatic radicals, and combinations thereof, possessing hydroxy, ester, aldehydic, or ketonic substituents, or other linkages, the total number of said substituents and linkages preferably not exceeding two. Radicals containing carbon, hydrogen, and sulfur only, the sulfur being present as sulfide linkages, include saturated and unsaturated hydrocarbyl radicals in which one or more methylene groups not adjacent to the thiol groups in the molecule are replaced by monosulfide linkages, said monosulfide linkages being separated by at least one carbon atom when more than one monosulfide linkage is present, and the number of said monosulfide linkages preferably not exceeding 10. The polythiol is free from polysulfide linkages and the major portion of the sulfur remains in elemental form rather than being chemically bonded within the organic polymer molecule.

Even more desirable properties are obtained if the plasticized sulfur compositions are prepared through use of a trithiol or tetrathiol, preferably a trithiol, in combination with a dithiol. The use of a mixture of a dithiol and a trithiol or tetrathiol results in plasticized sulfur compositions whose properties are quite different than would be expected on the basis of the properties of compositions prepared through use of the polythiols individually.

Any basic catalyst can be employed in the preparation of such plasticized compositions. The preferred catalysts are amines, ammonia, and the oxides, hydroxides, and carbonates of lithium, sodium, potassium, rubidium, cesium, magnesium, calcium, strontium, and barium. The amines can be primary, secondary or tertiary, and they can contain saturated or unsaturated aliphatic or cycloaliphatic groups or aromatic groups, or combinations thereof, in the molecule. Heterocyclic amines are included among the applicable amines. The amines most generally preferred are the saturated aliphatic amines having 3–20 carbon atoms. Some examples of amines of this type are:

propylamine
trimethylamine
N-methylethylamine
isobutylamine
hexylamine
octylamine diphenylamine
tripropylamine
tributylamine
diheptylamine
N,N-dihexyloctylmine Amines and ammonia are particularly useful catalysts when a rapid reaction between the polythiol and sulfur is desired. On the other hand, calcium carbonate is a cheap and especially useful catalyst when it is desirable or necessary that the composition be maintained at an elevated temperature for a prolonged period of time.

In the preparation of such compositions, the ratio of polythiol to sulfur will usually be in the range of 3–30 parts by weight of polythiol to 100 parts by weight of sulfur, preferably in the range of 5–20 parts by weight of polythiol to 100 parts by weight of sulfur. The concentration of basic catalyst is not critical, but the catalyst is preferably employed in an amount equivalent to 0.01–5 parts by weight per 100 parts by weight of sulfur.

Although any of the polythiols can be used in combination, it is often especially advantageous to employ both a dithiol and a trithiol or tetrathiol in the preparation of the plasticized sulfur compositions. The dithiol and tri- or tetrathiol can be employed over a wide range of ratios; however, the ratio of dithiol to tri- or tetrathiol should usually be in the range of 1:9 to 9:1, and will most often be in the range of 1:4 to 4:1, depending on the nature of the polythiols and on the properties desired in the plasticized sulfur compositions. The above-referred to ratios are by weight.

Although the plasticized sulfur compositions are preferably prepared in the absence of added solvent, suitable solvents such as chloroform, carbon tetrachloride, benzene, toluene, and xylene can be used. The reaction temperature is generally maintained within the range of about −20 to 250° C. preferably within the range of about 20 to 200° C. The reaction period varies, depending on the temperature and on the nature and concentration of the compounds in the reaction system, but should be in the range of about 1 minute to about 2 days, usually being within the range of about 3 minutes to about 4 hours. The pressure need be only sufficient to maintain the polythiols and solvent, if used, substantially in the liquid phase. Hydrogen sulfide, which is evolved during the reaction, can be removed as it is formed. If a solvent is used, the solvent can be removed by volatilization upon completion of the reaction.

To increase the tensile and impact strength of the compositions of this invention, reinforcing agents such as fibers of glass, metal, or other material can be incorporated into the compositions.

Plasticization of the sulfur to form marking compositions can be carried out through the use of 3-(2-mercaptoethyl)cyclohexanethiol or 4-(2-mercaptoethyl)cyclohexanethiol, used singly or in combination. These dithiols can be readily prepared, e.g., by the method disclosed in U.S. 3,050,452. Furthermore, it is not necessary to remove higher-boiling substances, e.g., sulfides, that are normally present, as the crude mixture of isomeric dithiols contaminated with higher-boiling substances is quite suitable, thus permitting the plasticizer to be obtained at low cost.

Preferably, the sulfur is first plasticized, and the white extender pigment and halogenated polyphenyl are then added, either at the same time or either one followed by the other. Thorough mixing of the extender pigment and halogenated polyphenyl with the plasticized sulfur is readily achieved by stirring at a temperature at which the plasticized sulfur is molten. Less preferably, the pigment and/or halogenated polyphenyl can be added to the sulfur and/or to the plasticizer prior to plasticization of the sulfur.

White extender pigments suitable for use in these compositions are those pigments selected from the group consisting of calcium carbonate, calcium sulfate, magnesium silicate, magnesium carbonate, magnesium oxide, china clay, pyrophyllite, mica, pumic, bentonite, silica, diatomite, barium sulfate, barium carbonate, alumina hydrate, and calcium silicate.

Halogenated polyphenyls which can be used in these compositions include halogenated biphenyl, halogenated o-terphenyl, halogenated m-terphenyl, and halogenated p-terphenyl. Mixtures of these halogenated polyphenyls, of course, can be used. The halogenated biphenyl can have 1–10 halogen atoms per molecule, and each of the halogenated terphenyls can have 1–14 halogen atoms per molecule. Although the halogen in the halogenated biphenyl and halogenated terphenyls can be fluorine, chlorine, bromine, or iodine, it is preferable that the halogen be chlorine. Particularly useful halogenated biphenyl and halogenated terphenyls are the chlorinated biphenyl and chlorinated terphenyls available from Monsanto Co.

Plasticization of sulfur by the mercaptoethylcyclohexanethiols requires no catalyst. However, basic catalysts such as amines, ammonia, and the oxides, hydroxides, and carbonates of lithium, sodium, potassium, rubidium, cesium, magnesium, calcium, strontium, and barium can be used, e.g., in amounts up to about 5 weight percent of the sulfur employed, if an accelerated reaction is desired. Although solvents such as chloroform, carbon tetrachloride, benzene, toluene, and xylene can be present during the plasticization, it is preferred that they not be used.

The ration of mercaptoethylcyclohexanethiols to sulfur can vary within a broad range, but will usually be within the range of about 3–20 parts by weight of dithiol to 100 parts by weight of sulfur, preferably within the range of about 5–20 parts by weight of dithiol to 100 parts by weight of sulfur. The temperature at which the plasticization is carried out is generally maintained within the range of about 50–250° C., preferably within the range of about 100–200° C. The time required for the plasticization varies depending on the temperature and on the nature and concentration of the components in the system, but should be within the range of about 5 minutes to about 2 days, usually being within the range of about 10 minutes to about 6 hours.

The white extender pigment and halogenated polyphenyl are preferably added to the plasticized sulfur, mixing being achieved by stirring or otherwise agitating the pigmented molten mixture. The ratio of pigment to plasticized sulfur should be within the range of about 1–50 parts by weight of pigment to 100 parts by weight of plasticized sulfur, preferably being within the range of about 3–20 parts by weight of pigment to 100 parts by weight of plasticized sulfur. The ration of halogenated polyphenyl to plasticized sulfur should be within the range of about 1–50 parts by weight of halogenated polyphenyl to 100 parts by weight of plasticized sulfur, preferably being within the range of about 3–20 parts by weight of halogenated polyphenyl to 100 parts by weight of plasticized sulfur. In general, the use of equal amounts, by weight, of pigment and halogenated polyphenyl gives a suitable product.

The plasticized sulfur marking compositions of this invention are of sufficient whiteness and impact strength to make them ideally suitable as white marking compositions, for example, in the marking of highways, streets, roads, airport landing strips, and the like. Of course, other materials such as sand, glass beads, and the like can be added to impart special properties sometimes desired in marking compositions.

The new plasticized sulfur mixtures should contain sufficient persulfide to reduce and maintain the viscosity of the mixture at a level which permits the use of rapid application techniques. Specifically, viscosities within the range of from about 150 centipoises to about 5000 centipoises (cp.), when measured at about 160° C., are presently preferred.

To obtain the desired viscosities, from about 0.1 to about 20, preferably 1 to about 5, parts by weight of persulfide should be present in 100 parts of the sulfur-based composition. The amount of viscosity improver will, of course, depend principally on the chemical composition of the plasticized sulfur material, particularly on its filler or pigment content. Titanium dioxide pigment, for example, greatly thickens the composition. It is frequently satisfactory to provide from about 0.001 to about 0.2 part of the persulfide per part of pigment.

The following examples serve to illustrate the dramatic effect produced by making plasticized sulfur compositions with a persulfide compound containing at least one oxygenated radical. In particular, Example I demonstrates an immediate and rapid lowering of the viscosity of a plasticized sulfur composition containing a titanium dioxide pigment immediately after adding the persulfide.

EXAMPLE I 3-mercaptopropionic acid-sulfur reaction product.—A mixture of 3-mercaptopropionic acid (106 g., 1 mol) and sulfur (64 g., 2 mols) was stirred in a vessel warmed by a 170° C. oil bath for 4 hours. Hydrogen sulfide was evolved; the sulfur dissolved and the mixture became slightly viscous. The product weighed 130.5 g. and set to a yellow, opaque, waxy solid when cooled.

Preparation of mixture.—Two batches of a plasticized sulfur composition were made from the materials shown below:

| | Batch 1 (g.) | Batch 2 (g.) |
|---|---|---|
| Sulfur | 430 | 430 |
| Filler (Ice Cap K)[1] | 50 | 50 |
| Thinner[2] | 62.5 | 62.5 |
| Plasticizer (ethylcyclohexyl-disulfide) | 70 | 70 |
| Pigment (TiO$_2$) | 100 | 100 |
| 3-mercaptopropionic acid-sulfur reaction product | 10 | 0 |

[1] Calcined aluminum silicate.
[2] Chlorinated biphenyl containing approximately 32 weight percent Cl.

The two samples were stirred, while maintained in a 158–162° C. oil bath, for 1 hour after adding the filler and pigment. The following viscosity measurements were made:

| | Viscosity, Centipoises (at 160±2°C.) | |
|---|---|---|
| Time, min. | Batch 1 | Batch 2 |
| 6 | Filler and pigment added | |
| 90 | 2,600 | 35,000 |
| 15 | | (1) |
| 005 | | 2,080 |

[1] Added 10 g. 3-mercaptopropionic acid-sulfur product.

These data show that the 3-mercaptopropionic acid-sulfur product can be added to the formulation initially to prevent an excessive increase in the viscosity while the pigmented composition is being formed (Batch 1) or later to reduce the viscosity after the pigmented and plasticized composition is formed (Batch 2).

EXAMPLE II.—(Additive 2)

2-mercaptoethanol-sulfur reaction product.—2-mercaptoethanol (78.1 g., 1 mol) and sulfur (64.0 g., 2 mols) were stirred together for about 30 minutes at room temperature until the excess foaming due to H$_2$S evolution stopped. The mixture was then stirred in a 170° C. bath for 3.5 hours. The product weighed 115.7 g. It set to a mushy mixture on standing. Crystals were formed which appeared to be needles.

EXAMPLE III.—(Additive 3)

Thioglycolic acid-sulfur reaction product.—Thioglycolic acid (92.0 g., 1 mol) and sulfur (64.0 g., 2 mols) were combined and stirred in a 400 ml. beaker in an oil bath (138–160° C.) for 4 hours. The product weighed 114.3 g., and was a yellow, tacky mass when cooled.

EXAMPLE IV

Viscosity comparisons.—Plasticized sulfur formulations were prepared using the following:

| Material | Parts by weight |
|---|---|
| Sulfur | 86 |
| Filler (Ice Cap K)[1] | 10 |
| Thinner[2] | 12 |
| Plasticizer (ethylcyclohexyldisulfide) | 14 |
| Pigment (TiO$_2$) | 40 |
| Viscosity control additive | 4 |

[1] Calcined aluminum silicate.
[2] Chlorinated biphenyl containing approximately 32 weight percent Cl.

The materials were stirred together in a 500 ml. beaker in an oil bath at 155–160° C. for one hour. Viscosity measurements, where possible, were made as in Example I. Four samples were prepared, each of which contained a different viscosity control additive. The results are shown in the table below:

| Sample | Viscosity control additive | Viscosity, cp. |
|---|---|---|
| A | Bis(hydroxyethyl)persulfide | 4,400 |
| B | Bis(carboxymethyl)persulfide | 4,800 |
| C | Thiodipropionic acid | 20,000 |
| D | Diallyldisulfide | (1) |

[1] Too viscous to measure.

Sample A contained the product of Example II. Sample B contained the product of Example III. Sample C, a control test, contained thiodipropionic acid, a monosulfide. Sample D, a control test, contained diallyldisulfide, a disulfide which contained no oxygenated radical, and was so viscous and rubbery that its viscosity could not be measured. Comparison of the results shows that a persulfide linkage and an oxygenated radical must be present for effective viscosity control.

EXAMPLE V

The plasticizer ethylcyclohexyldisulfide and bis(carboxyethyl)persulfide were prepared simultaneously to produce a mixed plasticizer/viscosity stabilizer additive.

The following ingredients were stirred together in a 600 ml. beaker in a 160–170° C. oil bath for 4 hours:

| | G. |
|---|---|
| 3- (and 4-) (2-mercaptoethyl)cyclohexanethiol | 170 |
| Sulfur | 116 |
| 3-mercaptopropionic acid | 51.7 |

A viscous, orange mixture was obtained, which contained about a 70:20 ratio of plasticizer to stabilizer.

The product was tested in the following recipe:

| | G. |
|---|---|
| Sulfur | 430 |
| Filler[1] | 50 |
| Thinner[2] | 62.5 |
| Plasticizer/viscosity stabilizer | 90 |
| Titanium dioxide pigment | 200 |

[1] Calcined aluminum silicate.
[2] Chlorinated biphenyl containing approximately 32 weight percent Cl.

The viscosity of this composition was found equivalent to those tested in Example IV, Samples A and B.

Reasonable variation and modification are possible within the spirit and scope of the invention, the essence of which is a method of reducing the viscosity of plasticized sulfur compositions comprising forming a mixture of said plasticized sulfur compositions and a persulfide compound containing at least one oxygenated radical. A new composition of matter comprising a plasticized sulfur composition containing a persulfide compound having at least one oxygenated radical is obtained.

I claim:
1. A plasticized sulfur composition of reduced viscosity which forms on mixing elemental sulfur, an organic sulfur-plasticizing agent selected from at least one of aryl, alkyl, alkaryl, and aralkyl poly-sulfides, organic polythiols, chlorinated polyphenyls, wood rosin, natural rubber, butyl rubber, olive oil, and alkyd resins and a viscosity reducing persulfide of the formula A—R—S$_x$—R—A, wherein each A is selected from carboxyl, hydrogen and hydroxyl radicals, at least one A being selected from carboxyl and hydroxyl radicals, each R is selected from saturated aliphatic, saturated cycloaliphatic, and aromatic radicals and combinations thereof, and $x$ is an integer of from about 2 to about 5 and wherein said persulfide is present in an amount equal to about 0.1 to about 20 parts by weight per 100 parts of said plasticized sulfur composition.

2. A composition of matter as defined in claim 1 wherein the persulfide is selected from bis(2-carboxyethyl)persulfide and said organic sulfur-plasticizing agent is selected from 3-(2-mercaptoethyl)cyclohexanethiol and 4-(2-mercaptoethyl)cyclohexanethiol.

3. The composition of claim 1 wherein each R has up to about 10 carbon atoms.

4. The composition of claim 1 wherein said organic sulfur plasticizing agent is an organic polythiol and a minor portion of said elemental sulfur reacts with said polythiol prior to the addition of said viscosity reducing agent.

5. The composition of claim 4 wherein said polythiol is represented by the formula Y(SH)$_n$ wherein $n$ is an integer selected from 2, 3 and 4, Y is an organic radical having a valence of $n$ and from about 2 to about 30 carbon atoms and being selected from radicals consisting of (a) carbon and hydrogen; (b) carbon, hydrogen, and oxygen; and, (c) carbon, hydrogen, and sulfur in the form of monosulfide linkages.

6. The composition of claim 5 wherein said polythiol comprises a dithiol and at least one thiol having more than two functional thiol groups.

7. The composition of claim 5 wherein said plasticized sulfur composition comprises from 3 to about 30 parts by weight of said polythiol per 100 parts of said elemental sulfur.

8. The composition of claim 1 further comprising an inorganic filler.

9. The composition of claim 8 wherein said filter is selected from fibrous and powdered glass and metal.

10. The composition of claim 1 further comprising an extender pigment selected from calcium carbonate, calcium sulfate, magnesium silicate, magnesium carbonate, magnesium oxide, china clay, pyrophyllite, mica, pumic, bentonite, silica, diatomite, barium sulfate, barium carbonate, alumina hydrate, and calcium silicate and at least one of halogenated biphenyls and terphenyls having from 1 to about 10 halogen atoms per molecule, said halogens being selected from fluorine, chlorine, bromine and iodine.

11. A plasticized sulfur composition according to claim 1 wherein said mixing is accomplished at a temperature of from about −20° C. to about 250° C.

12. The composition according to claim 5 wherein said reaction occurs in the presence of a promoting amount of a basic catalyst.

13. The composition according to claim 12 wherein said catalyst is present in an amount equal to 0.01 to 5 parts by weight per 100 parts by weight of sulfur.

14. The composition according to claim 10 wherein said pigment is present in the range of from about 1 to about 50 parts by weight per 100 parts of plasticized sulfur.

15. The composition according to claim 14 wherein said persulfide is present in an amount equal to about 0.001 to about 0.2 parts by weight per part of pigment.

16. The composition of claim 12 wherein said basic catalyst is at least one of amines, ammonia, and oxides, hydroxides, and carbonates of lithium, sodium, potassium, rubidium, cesium, magnesium calcium, strontium, and barium.

References Cited
UNITED STATES PATENTS

| | | | |
|---|---|---|---|
| 2,676,165 | 4/1954 | Fettes | 260—79 |
| 2,746,994 | 5/1956 | Heimer | 260—608 |
| 2,707,685 | 5/1955 | Seymour et al. | 23—224 X |

JULIUS FROME, *Primary Examiner.*

T. MORRIS, *Assistant Examiner.*

U.S. Cl. X.R.

106—287